United States Patent [19]

Crink

[11] Patent Number: 4,902,063

[45] Date of Patent: Feb. 20, 1990

[54] SLIDING SUN VISOR

[75] Inventor: Robert E. Crink, Birmingham, Mich.

[73] Assignee: General Motors Corporation, Detroit, Mich.

[21] Appl. No.: 272,963

[22] Filed: Nov. 18, 1988

[51] Int. Cl.$^4$ .............................................. B60J 3/02
[52] U.S. Cl. .............................. 296/97.11; 296/97.12
[58] Field of Search .................. 296/97.9, 97.11, 97.12, 296/97.1; 248/291

[56] References Cited

U.S. PATENT DOCUMENTS

| | | | |
|---|---|---|---|
| 2,288,481 | 6/1942 | Pelcher et al. | 296/97.11 |
| 2,301,080 | 11/1942 | Roberts | 296/97.11 |
| 2,322,898 | 6/1943 | Van Dresser | 296/97.11 |
| 2,340,015 | 1/1944 | Pelcher et al. | 296/97.11 |
| 4,582,356 | 4/1986 | Kaiser et al. | 296/97 K |

Primary Examiner—Margaret A. Focarino
Assistant Examiner—Joseph D. Pape
Attorney, Agent, or Firm—Charles E. Leahy

[57] ABSTRACT

A sunshade panel is mounted on a support rod by a bearing assembly which permits the sunshade to pivot about the rod and to slide axially along the rod. The bearing assembly includes a sleeve of roll formed sheet metal which encircles the rod and is rotatable thereon. The sunshade panel is mounted on a sunshade carrier which encircles the sleeve in radially spaced relation from the sleeve. A low friction slide element is interposed in the space between the carrier and the sleeve. The slide element is preferably a VELCRO-like material including a base of plastic or fabric and having a plurality of radially projecting resiliently flexible friction fingers which project to fill the radial space and enable sliding movement of the sunshade panel relative to the support rod by virtue of the frictional slip and resilient flexure of the fingers. The fingers of the slide element readily accommodate dimensional irregularities between the shape of the carrier and the sleeve.

3 Claims, 1 Drawing Sheet

SLIDING SUN VISOR

The invention relates to an automobile sun visor and, more particularly, a sun visor which both pivots and slides along a support rod.

BACKGROUND OF THE INVENTION

It is known in vehicle body sunshades to mount a sunshade panel on a support rod which is pivotally mounted on the vehicle body. This sunshade panel is pivotal on the rod so that the sun visor can be moved between a stored position against the headliner or pivoted down to shield the driver's eyes from incoming sunlight. It is also known to provide such a sunshade which slides axially along the support rod so that the sunshade may be better positioned to block the sunlight.

Prior art sunshades have employed somewhat complex bearing devices to permit the sunshade to both rotate about the rod and slide axially along the rod.

The present invention provides a new and improved sliding sunshade of economical manufacture.

SUMMARY OF THE INVENTION

According to the invention, the sunshade panel is mounted on a support rod by an improved bearing assembly which permits the sunshade to pivot about the rod and to slide axially along the rod. The bearing assembly includes a sleeve of roll formed sheet metal which encircles the rod and is rotatable thereon. The sunshade panel is mounted on a sunshade carrier which encircles the sleeve in radially spaced relation from the sleeve. A low friction slide element is interposed in the space between the carrier and the sleeve. The slide element is preferably a VELCRO-like material including a base of plastic or fabric and having a plurality of radially projecting resiliently flexible friction fingers which project to fill the radial space and enable sliding movement of the sunshade panel relative to the support rod by virtue of the frictional slip and resilient flexure of the fingers. The fingers of the slide element readily accommodate dimensional irregularities between the shape of the carrier and the sleeve. A detent mechanism may be provided between the sleeve and the rod to detent the sun visor at its rotary position stored against the vehicle headliner.

BRIEF DESCRIPTION OF THE DRAWINGS

These and other objects, features and advantages of the invention will become apparent upon consideration of the description of the preferred embodiment and the appended drawings in which.

DESCRIPTION OF THE PREFERRED EMBODIMENT

Figure 1:
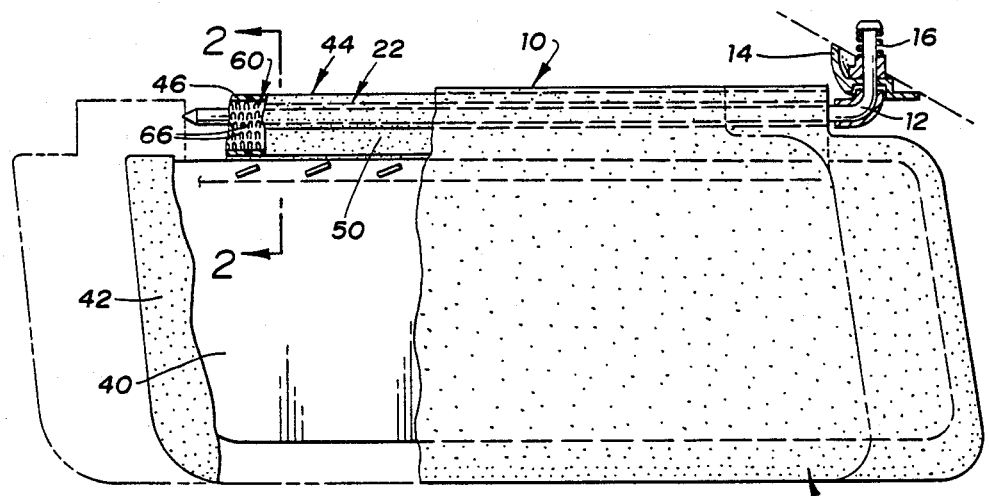
FIG. 1 is an elevation view of the sun visor mounted in a vehicle body.

Referring to FIG. 1, it is seen that the sun visor generally indicated at 10 includes a support rod 12 which is mounted on a vehicle body roof by a mounting escutcheon 14 and spring 16 in a manner by which the rod 12 may be pivoted relative to the vehicle body. The sun visor 10 also includes a sunshade panel 20 which is mounted on the rod 12 by a bearing assembly generally indicated at 22 which enables the sunshade panel 20 to both rotate about the rod 12 and to slide along the rod 12 between the solid line indicated position of FIG. 1 and the phantom line indicated position of FIG. 1.

Figure 3:
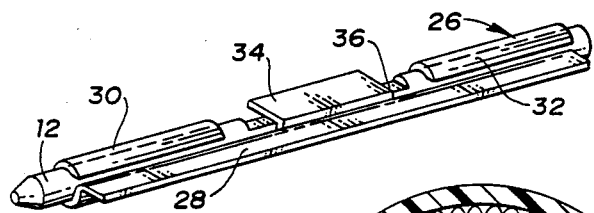
FIG. 3 is a perspective view of the sun visor showing the detent mechanism acting between the sleeve and the rod.
Figure 2:
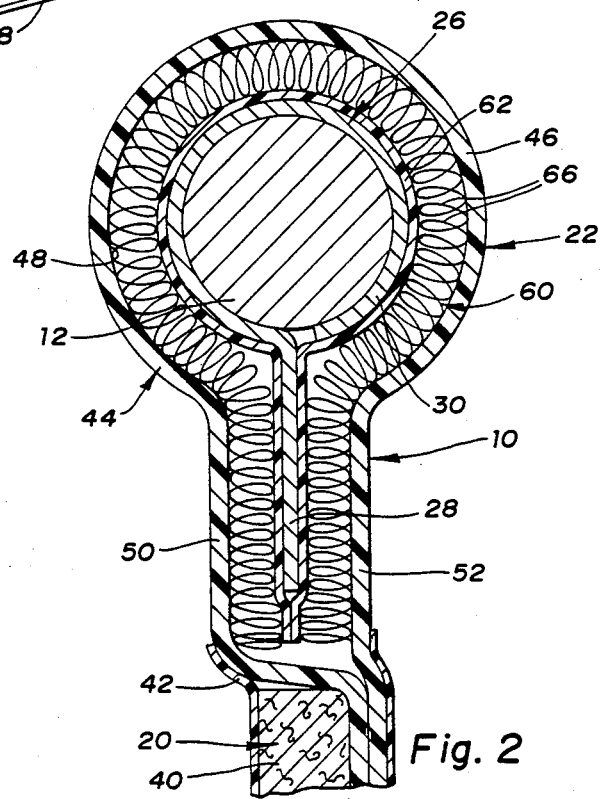
FIG. 2 is a sectional view taken in the direction of arrows 2—2 of FIG. 1.

Referring to FIGS. 2 and 3, it is seen that the mounting rod 12 is encircled by a sleeve assembly 26. The sleeve assembly 26, as best seen in FIG. 3, is roll formed from sheet metal and includes a stem 28, spaced apart tubular portions 30 and 32 which encircle the mounting rod 12, and a central detent finger 34 which is positioned between the tubular portions 30 and 32. The detent finger 34 aligns with a flattened area 36 of the support rod 12. The sleeve 26 is rotatable about the rod 12 as permitted by flexure of the detent finger 34. When the detent finger 34 seats in the flattened area 36, as shown in FIG. 3, the sleeve 26 is detented at a desired position, preferably to establish the sun visor at a stored position against the headliner of the vehicle.

As best seen in FIG. 2, the sunshade panel 20 includes a foundation board 40 covered with vinyl sheeting 42. The foundation board 40 is connected to the rod 12 by a molded plastic or roll formed metal carrier 44. The carrier 44 has a tubular cross section 46 which is larger in diameter than the tubular portions 30 and 32 of the sleeve assembly 26 so that a radial spacing 48 is defined between the tubular portions 30 and 32 and the tubular portion 46 of the carrier 44. The carrier 44 also has legs 50 and 52 which extend parallel with, but spaced away from, the stem 28 of the sleeve assembly 26. The terminal ends of the legs 50 and 52 are stapled or otherwise suitably attached t the foundation board 40.

Referring again to FIG. 2, it is seen that a low friction slide element 60 is interposed in the radial space 48 between the sleeve assembly 26 and the carrier 44. The slide element 60 is preferably a VELCRO loop-type material including a plastic base 62 having a plurality of fingers 66 projecting therefrom. The fingers 66 may be a looped thread, as shown in FIG. 2, or a plurality of independently molded plastic projections. In either case, the fingers 66 are of sufficient length to fill the radial space 48 between the tubular portions 30 and 32 and the sleeve portion 46 of carrier 44. The base 62 of the slide element 60 is attached to the tubular portions 30 and 32 and the stem 28 of the sleeve assembly 26 by a suitable adhesive.

As best seen in FIG. 1, the sunshade panel 20 may be shifted left and right by sliding the panel along the length of the rod 12 as permitted by the bearing assembly 22. In particular, referring to FIG. 2, it is understood that this sliding action is permitted by the frictional sliding of the carrier 44 on the fingers 66. The fingers 66 flex, yield, bend and frictionally slip as necessary to permit the sliding movement of the sunshade.

The "feel" of the sliding of the sunshade is determined by controlling the stiffness and material of the fingers 66. In addition, it will be understood that the fingers 66 will forgive dimensional variations in the spacing between the sleeve assembly 26 and the carrier 44. Accordingly, the manufacturing processes employed to stamp the sleeve assembly 26 and to form the plastic carrier 44 need not be as closely controlled as in prior art bearing assemblies where plastic and metal parts are precisely formed in shape to provide the desired compromise between ease of sliding movement and resistance to sliding movement.

While the preferred embodiment shown in the drawings employs a VELCRO-type material of the type having loops, it will be appreciated that VELCRO-type hook fasteners may also be employed. Alternatively, rather than VELCRO-type material, any construction having a base and radially projecting fingers may be employed.

Thus, it is seen that the invention provides a new and improved sliding sunshade for a motor vehicle in which the bearing assembly enabling sliding movement of the sunshade is provided by plurality of resilient fingers extending radially between the rod and sunshade.

The embodiments of the invention in which an exclusive property or privilege is claimed are defined as follows:

1. A vehicle sun visor comprising:
   support means mounted on the vehicle body,
   a sunshade panel,
   a sunshade carrier encircling the support means in radially spaced relation therefrom and having the sunshade panel mounted thereon,
   and a low friction slide element interposed in the radial space between the carrier and the support means, said slide element including a base having a plurality of radially projecting resiliently flexible friction slippable fingers projecting to fill the radial space and enable movement of the sunshade panel relative to the support means by virtue of frictional slip and resilient flex of the fingers.

2. A vehicle sun visor comprising:
   a rod mounted on the vehicle body,
   a sleeve encircling the rod and rotatable thereabout,
   a sunshade panel,
   a carrier encircling the sleeve in radially spaced relation therefrom and having the sunshade panel mounted thereon,
   and a low friction slide element interposed in the space between the carrier and the sleeve, said slide element including a base attached to one of the carrier and sleeve and a plurality of radially projecting resilient fingers projecting into frictional engagement with the other of the carrier and sleeve so that movement of the carrier relative to the sleeve is permitted by the frictional slip of the resilient fingers to adjust the position of the sun visor.

3. A vehicle sun visor comprising:
   a sunshade panel
   a rod mounted on the vehicle body,
   a sleeve encircling the rod and rotatable thereabout,
   detent means acting between the sleeve and the rod to detent the rotary position or the sleeve relative to the rod,
   a carrier encircling the sleeve in radially spaced relation therefrom,
   means mounting the sunshade panel on the carrier,
   and a low friction slide element interposed in the space between the carrier and the sleeve, said slide element including a base attached to one of the carrier and sleeve and a plurality of radially projecting resilient fingers projecting into frictional engagement with the other of the carrier and sleeve so that longitudinal movement of the carrier relative to the sleeve is permitted by the frictional slip of the resilient fingers to adjust the position of the sun visor.

* * * * *